Nov. 8, 1938.  T. C. DELAVAL-CROW  2,136,125

LOCKING DEVICE FOR BEARINGS AND THE LIKE

Filed Feb. 26, 1936

INVENTOR:
THOMAS C. DELAVAL-CROW,
BY Gales P. Moore
HIS ATTORNEY.

Patented Nov. 8, 1938

2,136,125

UNITED STATES PATENT OFFICE 2,136,125

LOCKING DEVICE FOR BEARINGS AND THE LIKE

Thomas C. Delaval-Crow, Bristol, Conn., assignor to General Motors Corporation, Detroit, Mich., a corporation of Delaware Application February 26, 1936, Serial No. 65,855

6 Claims. (Cl. 308—236)

This invention relates to locking devices for bearings and the like and comprises all of the features of novelty herein disclosed. An object of the invention is to provide improved locking means for retaining a bearing or a ring such as a bearing race ring on a shaft. Another object is to provide a bearing locking device of great thrust capacity and adapted for assembly between a shaft and a housing especially when the space for entry is restricted as in a mine car wheel.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a sectional view of a wheel and axle with some parts in section on the line 1—1 of Fig. 2 and some in section on line 1A—1A of Fig. 3.

Figure 1:
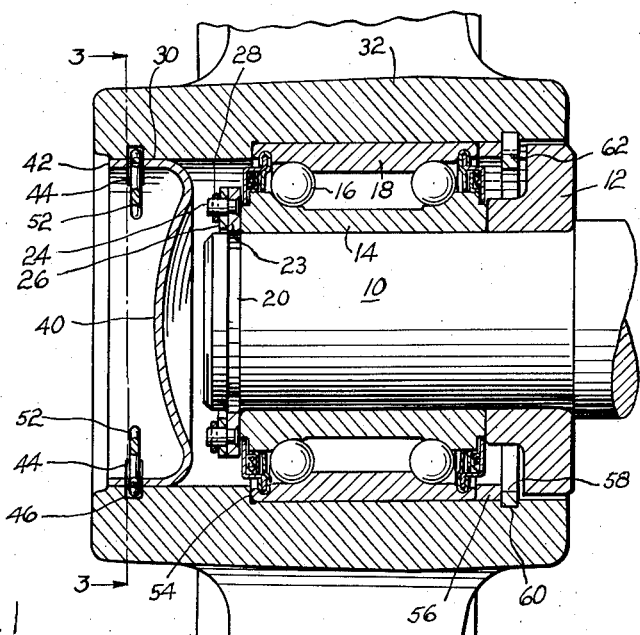
Figure 2:
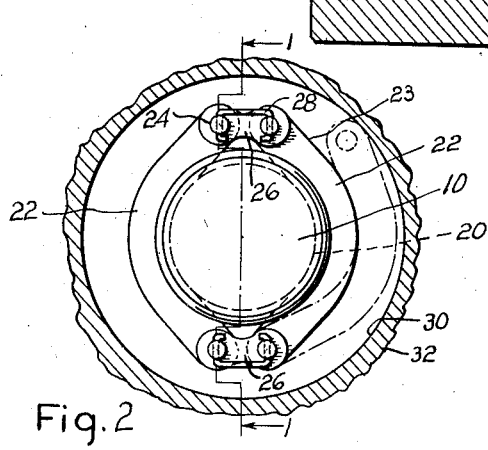
Fig. 2 is a cross section taken just inside the hub cap, some parts being removed.
Figure 3:
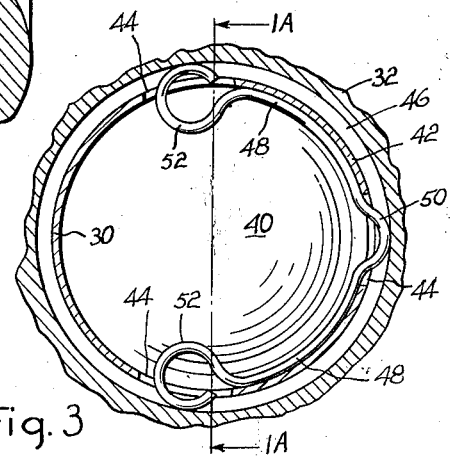
Fig. 3 is a cross section on the line 3—3 of Fig. 1.

The numeral 10 indicates an axle or shaft, such as that of a mine car, having pressed onto it against a shoulder a collar 12. An inner race ring 14 is sleeved over the shaft against the collar and has raceways for two rows of balls 16 which also run in raceways of an outer race ring 18. Flush with the outer end of the race ring 14, the shaft is provided with a deep groove 20 having straight side walls.

Arranged to removably enter the groove to lock the race ring is a pair of arms 22 each of which is arcuate for its greater portion to completely fill the groove for well over 90°, the arms having tangential extensions 23 each partly filling the groove and having its terminal end provided with a stud 24 adapted to receive an eye on a connecting link 26. To lock the links over the studs, a bent wire 28 is passed through openings in the studs outside of the link. To remove the locking device from the groove in the shaft, one of the bent wires is removed and the corresponding link 26 is removed whereupon the arms may be spread out around the opposite studs as pivots which will permit the arms to clear the end of the shaft without interference by the surrounding cylindrical bore 30 of the wheel hub or other housing 32.

The closure for the housing comprises a dished plate or disc 40 having a peripheral cylindrical flange 42 which is springy and adapted to fit in the bore 30 of the housing. The flange 42 has three slots 44 arranged to register with a groove 46 in the housing. A locking ring secures the flange to the housing and prevents axial movement of the flange in either direction. The ring comprises the arcuate portions 48 which bear against the inner surface of the flange 42, a central hump 50 which passes through one of the slots 44 into the groove 46, and a pair of curled ends 52 which form eyes adapted to enter the remaining slots 44 and the registering groove 46. Obviously by pulling the eyes 52 toward one another the split ring can be contracted to disengage it from the slots 44 whereupon the flange 42 and the disc 40 can be removed from the housing. The locking ring may be supported and handled with the cap when the latter is removed.

The outer race ring of the bearing is inserted in the wheel hub against a shoulder 54 thereof. A ring 56 engages the opposite end of the race ring and is locked by a split ring 58 adapted to enter a groove 60 in the hub and being easily removed by means of a tool applied to an inwardly curved portion 62 near one end of the split ring.

I claim:

1. In a device of the character indicated, a shaft having a groove and a member to be locked on the shaft at one side of the groove, and a locking device comprising a pair of arms each arm having an arcuate portion entering the groove with tangential extensions outside of the groove, and links connecting the extensions; substantially as described.

2. In a device of the character indicated, a shaft having a groove and a member to be locked on the shaft at one side of the groove, and a locking device comprising a pair of arms, each arm having an arcuate portion entering the groove, at least one end of each arm terminating in a substantially tangential extension projecting outside of the groove, studs on the adjacent tangential extensions, a link connecting the studs, and the other ends of the arms also projecting from the groove and having a detachable connection with one another; substantially as described.

3. In a device of the character described, a shaft having a groove and a member to be locked on the shaft at one side of the groove, and a locking device comprising a pair of pivoted arms, each arm having an arcuate portion fitting in the groove for substantially the full depth thereof, each arm also having end portions extending substantially tangentially from the arcuate portion, a pivot for one end of each arm, and a detachable connection between the other ends of the arms; substantially as described.

4. In a device of the character described, a shaft having a groove, a housing surrounding the shaft opposite to the groove, an antifriction bearing between the shaft and the housing at one side of the groove, and a bearing locking member comprising a pair of pivoted arms entering the groove and adapted to open up for withdrawal in the restricted space between the shaft and the housing, each arm having an arcuate portion fitting in the groove for substantially the full depth thereof and each arm also having at least one end portion extending substantially tangentially from the arcuate portion, a pivot for the tangential end of each arm, and a detachable connection between the other ends of the arms; substantially as described.

5. In a device of the character described, a shaft having a groove, a housing surrounding the shaft opposite to the groove, an antifriction bearing between the shaft and the housing at one side of the groove, and a bearing locking member comprising a pair of pivoted arms entering the groove and adapted to open up for withdrawal in the restricted space between the shaft and the housing, each arm having an arcuate portion fitting in the groove for substantially the full depth thereof and each arm also having end portions extending substantially tangentially from the arcuate portion, a link pivotally connected to adjacent ends of the arms, and a detachable connection between the other ends of the arms; substantially as described.

6. In a device of the character described, a shaft having a groove, a housing surrounding the shaft, an antifriction bearing between the shaft and the housing at one side of the groove, the housing having a portion of smaller diameter than the bearing to afford an abutment shoulder therefor, such portion surrounding the groove in the shaft, and a bearing locking member entering the groove and adapted to open up for withdrawal between the shaft and said portion of the housing, said locking member comprising a pair of arms, each arm having an arcuate portion fitting in the groove and end portions extending substantially tangentially from the arcuate portion, a pivot for one end of each arm, and a detachable connection between the other ends of the arms; substantially as described.

THOMAS C. DELAVAL-CROW.